(12) United States Patent
Liang

(10) Patent No.: US 7,869,056 B2
(45) Date of Patent: Jan. 11, 2011

(54) LINEAR DISPLACEMENT AND TILTING ANGLE MEASURING DEVICE

(75) Inventor: Chao-Wen Liang, Taoyuan (TW)

(73) Assignee: National Central University, Taoyuan (TW)

(*) Notice: Subject to any disclaimer, the term of this patent is extended or adjusted under 35 U.S.C. 154(b) by 342 days.

(21) Appl. No.: 12/243,504

(22) Filed: Oct. 1, 2008

(65) Prior Publication Data

US 2009/0091767 A1    Apr. 9, 2009

Related U.S. Application Data

(60) Provisional application No. 60/976,830, filed on Oct. 2, 2007.

(51) Int. Cl.
*G01B 9/02* (2006.01)
(52) U.S. Cl. .................................. 356/510; 356/493
(58) Field of Classification Search .................. 356/493, 356/510
See application file for complete search history.

(56) References Cited

U.S. PATENT DOCUMENTS

| | | | |
|---|---|---|---|
| 4,688,940 A | | 8/1987 | Sommargren et al. |
| 5,018,862 A | * | 5/1991 | Aiello ........................ 356/450 |
| 5,771,098 A | * | 6/1998 | Ghosh et al. ................ 356/508 |
| 7,230,717 B2 | | 6/2007 | Brock et al. |
| 7,391,521 B2 | * | 6/2008 | Ishizuka ..................... 356/493 |
| 2007/0229843 A1 | * | 10/2007 | Sesko ......................... 356/493 |

OTHER PUBLICATIONS

Zygo, A Primer on Displacement Measuring Interferometers, pp. 1-91, Revised Jan. 1999.
Bursanescu, L., and Vasiliu, V., "Laser System for High Accuracy Alignment and Positioning," American Institute of Physics, Rev. Sci. Instrum. 65 (5), pp. 1686-1690, May 1994.

* cited by examiner

*Primary Examiner*—Patrick J Connolly
(74) *Attorney, Agent, or Firm*—Kirton & McConkie; Even R. Witt

(57) ABSTRACT

A tilting angle measuring device includes an optical device, a four-quadrant optical detector and a computing unit. By the optical device, a light beam emitted by the coherent light source is processed into a reference beam and a test beam. The four-quadrant optical detector has four photoelectric converting units arranged in an array for respectively receiving the reference and test beams. The computing unit is electrically connected to the four-quadrant optical detector for computing a tilting angle of the object with respect to a predetermined position according to four intensity values of the test beam.

16 Claims, 4 Drawing Sheets

LINEAR DISPLACEMENT AND TILTING ANGLE MEASURING DEVICE

CROSS REFERENCE TO RELATED PATENT APPLICATION

This patent application claims the benefit of U.S. provisional patent application No. 60/976,830, filed on Oct. 2, 2007, which is incorporated by reference.

FIELD OF THE INVENTION

The present invention relates to a measuring device, and more particularly to a measuring device for simultaneously measuring the linear displacement and the tilting angle of an object.

BACKGROUND OF THE INVENTION

FIG. 1 is a schematic view of a displacement measuring interferometer according to the prior art. The displacement measuring interferometer of FIG. 1 principally comprises a laser source 10, a beam splitter 11, a reference surface 12, an object 13 and optical detector 14. The laser source 10 is a single wavelength coherent light source for emitting a laser beam. By the beam splitter 11, the laser beam emitted by the laser source 10 is split into two orthogonal polarized beams, i.e. a first sub-beam and a second sub-beam. The first sub-beam is directed to the reference surface 12, and the second sub-beam is directed to the object 13. The first sub-beam and the second sub-beam respectively reflected by the reference surface 12 and the object 13 are directed to the optical detector 14 through the beam splitter 11. On the optical detector 14, the first sub-beam interferes with the second sub-beam to produce an interference pattern relating to the wavelengths of the laser beams. According to a change of the interference pattern on the optical detector 14, a displacement between the object 13 and a predetermined location is deduced.

FIG. 2 is a schematic view of another displacement measuring interferometer according to the prior art. The displacement measuring interferometer of FIG. 2 principally comprises a laser source 20, a polarization beam splitter 21, a reference surface 22, a first quarter wave plate 220, an object 23, a second quarter wave plate 230, an analyzer 24 and an optical detector 25. The laser source 20 can emit a laser beam that is a combination of a P-polarized light of a first wavelength (or frequency) and an S-polarized light of a second wavelength (or frequency). By the polarization beam splitter 21, the laser beam emitted by the laser source 20 is split into two orthogonal polarized beams, i.e. a first sub-beam and a second sub-beam. According to a special design, the P-polarized light is reflected by the polarization beam splitter 21 but the S-polarized light is penetrated through the polarization beam splitter 21. As such, the P-polarized first sub-beam is directed to the reference surface 22 through the first quarter wave plate 220, reflected by the reference surface 22, and changed into an S-polarized first sub-beam after passing through the first quarter wave plate 220. Whereas, the S-polarized second sub-beam is directed to the object 23 through the second quarter wave plate 230, reflected by the object 23, and changed into a P-polarized second sub-beam after passing through the second quarter wave plate 230. The S-polarized first beam and the P-polarized second sub-beam are returned to the polarization beam splitter 21. Due to the optical characteristic properties, the S-polarized first beam is penetrated through the polarization beam splitter 21 but the P-polarized second sub-beam is reflected by the polarization beam splitter 21. Under this circumstance, the S-polarized first beam and the P-polarized second sub-beam are directed to the same side of the polarization beam splitter 21. After the S-polarized first beam and the P-polarized second sub-beam are directed through an analyzer 24, a reference signal associated with a frequency difference (f1-f2) between a first frequency f1 and a second frequency f2 is generated on the optical detector 25. Since the frequency of interference signal is influenced by the Doppler effect resulting from the moving object 23, a displacement between the object 23 and a predetermined location 26 is deduced.

The above-mentioned displacement measuring interferometers can be used to precise positioning machines such as semiconductor machines or precise machining apparatuses. The conventional displacement measuring interferometers, however, still have some drawbacks. For example, the tilting angle of the object fails to be measured by the conventional displacement measuring interferometers. In addition, the tilting angle of the object may adversely influence the accuracy of the measured displacement.

Therefore, there is a need of providing a tilting angle measuring device to obviate the drawbacks encountered from the prior art.

SUMMARY OF THE INVENTION

The present invention provides a tilting angle measuring device for measuring the tilting angle of an object.

The present invention also provides a displacement and tilting angle measuring device for simultaneously measuring the linear displacement and the tilting angle of an object.

In accordance with an aspect of the present invention, there is provided a tilting angle measuring device for use between a reference surface, an object and a coherent light source. The tilting angle measuring device includes an optical device, a four-quadrant optical detector and a computing unit. The optical device is used for receiving a light beam emitted by the coherent light source, and splitting the light beam into a first sub-beam and a second sub-beam, directing the first sub-beam to the reference surface such that a third sub-beam is reflected by the reference surface, directing the second sub-beam to the object such that a fourth sub-beam is reflected by the object, and processing the third and fourth sub-beams into a fifth sub-beam and a sixth sub-beam, respectively. The four-quadrant optical detector has four photoelectric converting units arranged in an array for respectively receiving the fifth and sixth sub-beams outputted by the optical device. The computing unit is electrically connected to the four-quadrant optical detector for computing a tilting angle of the object with respect to a predetermined position according to four intensity values of the sixth sub-beam.

In accordance with another aspect of the present invention, there is provided a displacement and tilting angle measuring device for use between a reference surface, an object surface and a coherent light source. The displacement and tilting angle measuring device includes an optical device, a four-quadrant optical detector and a computing unit. The optical device is used for receiving a light beam emitted by the coherent light source, and splitting the light beam into a first sub-beam and a second sub-beam, directing the first sub-beam to the reference surface such that a third sub-beam is reflected by the reference surface, directing the second sub-beam to the object surface such that a fourth sub-beam is reflected by the object surface, and processing the third and fourth sub-beams into a fifth sub-beam and a sixth sub-beam, respectively. The four-quadrant optical detector has four linear polarizers oriented in four polarization directions and arranged in an array and four photoelectric converting units arranged in an array for respectively receiving the fifth and sixth sub-beams outputted by the optical device. The computing unit is electrically connected to the four-quadrant optical detector for computing a displacement and a tilting angle of the object with respect to a predetermined position according to four intensity values of the sixth sub-beam.

BRIEF DESCRIPTION OF THE DRAWINGS

The above contents of the present invention will become more readily apparent to those ordinarily skilled in the art after reviewing the following detailed description and accompanying drawings, in which.

DETAILED DESCRIPTION OF THE PREFERRED EMBODIMENT

The present invention will now be described more specifically with reference to the following embodiments. It is to be noted that the following descriptions of preferred embodiments of this invention are presented herein for purpose of illustration and description only. It is not intended to be exhaustive or to be limited to the precise form disclosed.

Figure 1:
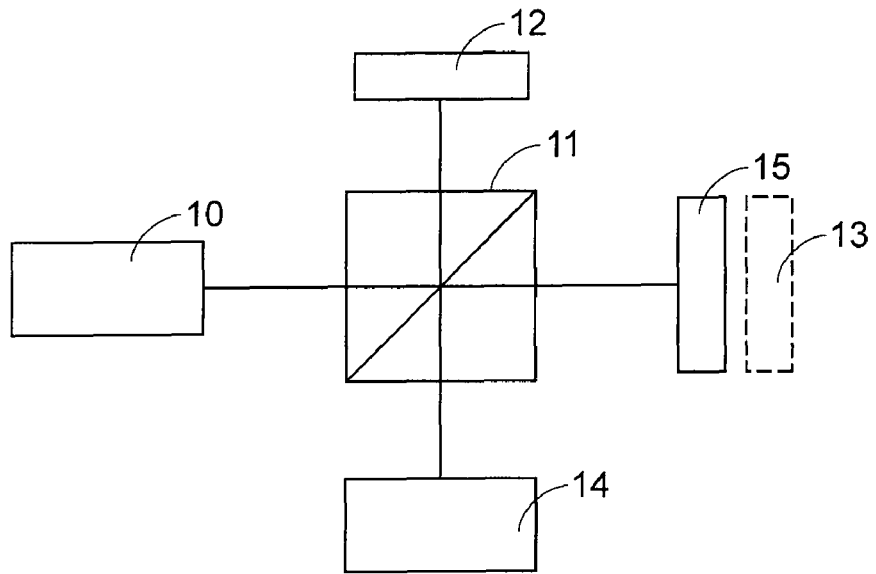
FIG. 1 is a schematic view of a displacement measuring interferometer according to the prior art.
Figure 2:
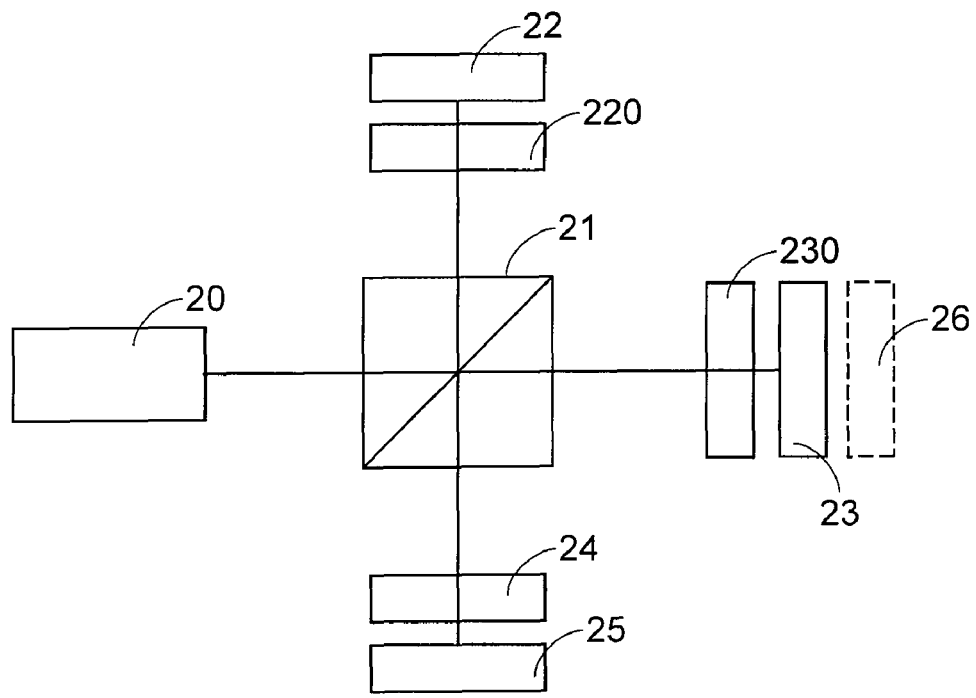
FIG. 2 is a schematic view of another displacement measuring interferometer according to the prior art.
Figure 3:
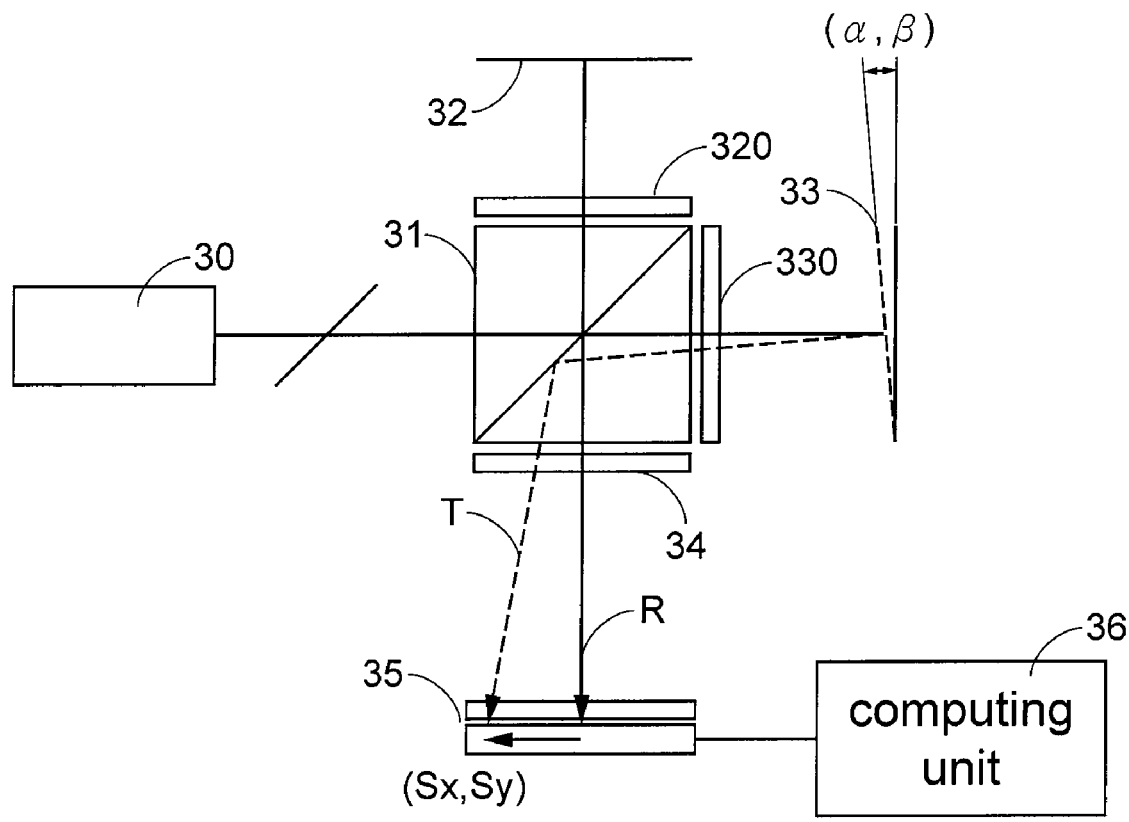
FIG. 3 is a schematic view illustrating a linear displacement and tilting angle measuring device according to a first preferred embodiment of the present invention.

FIG. 3 is a schematic view illustrating a linear displacement and tilting angle measuring device according to a first preferred embodiment of the present invention. This measuring device can be used for measuring the linear displacement and tilting angle of an object. As shown in FIG. 3, the measuring device principally comprises a laser source 30, a beam splitter 31, a reference surface 32, a first quarter wave plate 320, an object 33, a second quarter wave plate 330, an analyzer 34 and a four-quadrant optical detector 35. The beam splitter 31 used in the present invention includes a glass plate or a glass beam splitter cube. In a case that the beam splitter 31 is a glass beam splitter cube, the laser source 30 is a coherent light source for emitting a laser beam of a single wavelength. In addition, the beam splitter 31 can be a polarization beam splitter (PBS) that split the laser beam into orthogonal polarized beams. In a case that the beam splitter 31 is a polarization beam splitter (PBS), the laser source 30 is a coherent light source for emitting a laser beam that is a combination of a P-polarized light of a first wavelength (or frequency) and an S-polarized light of a second wavelength (or frequency). In this embodiment, the beam splitter 31 is a polarization beam splitter. By the polarization beam splitter 31, the laser beam emitted by the laser source 30 is split into two orthogonal polarized beams, i.e. a first sub-beam and a second sub-beam. The first sub-beam is directed to the reference surface 32 through the first quarter wave plate 320 such that a third sub-beam is reflected by the reference surface 32. The second sub-beam is directed to the object 33 through the second quarter wave plate 330 such that a fourth sub-beam is reflected by the object 33. The third sub-beam is directly penetrated through the beam splitter 31 and thus a fifth sub-beam (also referred as a reference beam R hereinafter) is directed to the four-quadrant optical detector 35. The fourth sub-beam is reflected by the polarization beam splitter 31 and thus a sixth sub-beam (also referred as a test beam T hereinafter) is directed to the four-quadrant optical detector 35.

Figure 4:
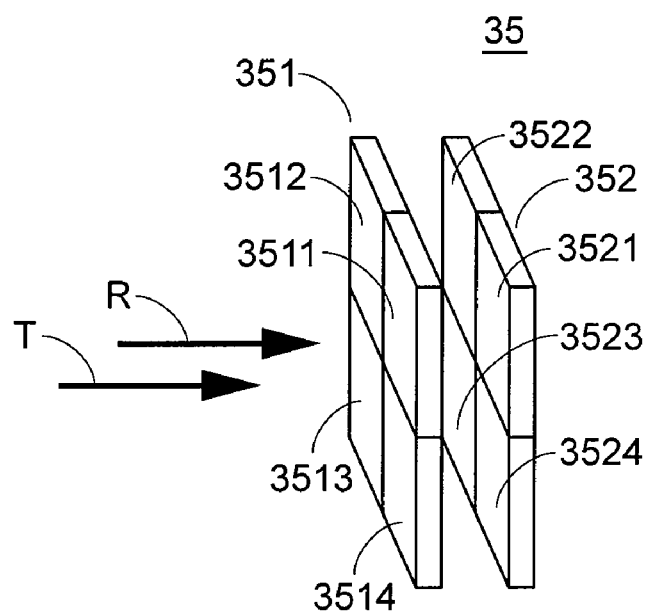
FIG. 4 is a schematic view illustrating an exemplary four-quadrant optical detector used in the present invention.
Figure 5:
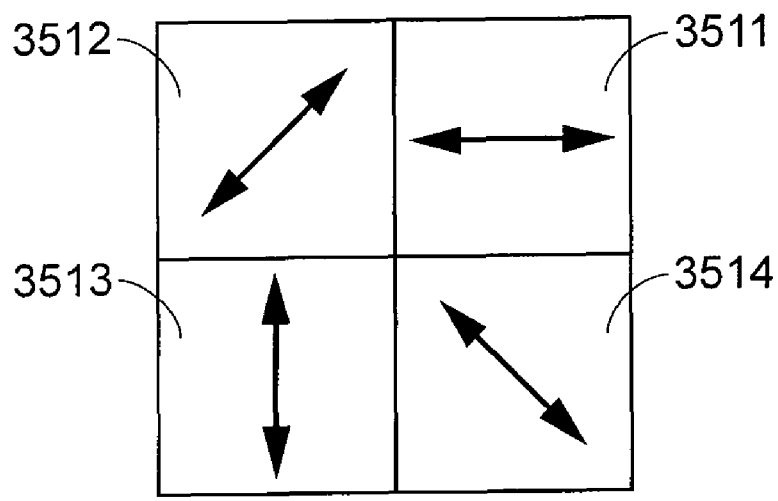
FIG. 5 is a schematic view illustrating polarization directions of a polarizer type phase array.

FIG. 4 is a schematic view illustrating an exemplary four-quadrant optical detector 35 used in the present invention. The four-quadrant optical detector 35 comprises a quadrant phase array 351 and a quadrant detector 352. The quadrant phase array 351 is deposited or mechanically fixed on the quadrant detector 352. Alternatively, the quadrant phase array 351 is separated from the quadrant detector 352 by a small gap. The quadrant phase array 351 has four linear polarizers 3511, 3512, 3513 and 3514 oriented in four polarization directions and arranged in a 2×2 array. The four linear polarizers are oriented in four uniformly distributed polarization directions so as to produce an array of four phase shifted interferograms. For example, as shown in FIG. 5, the four polarizers are oriented at 0 degree (3511), 45 degrees (3512), 90 degrees (3513), and 135 degrees (3514), respectively. The polarization directions are not restricted to those shown in FIG. 4. The quadrant detector 352 comprises four photoelectric converting units 3521, 3522, 3523 and 3524 that are arranged in a 2×2 array. In some embodiments, the four photoelectric converting units of the quadrant detector 352 are made of germanium, silicon or other semiconductor materials that can detect light beams.

Figure 6:
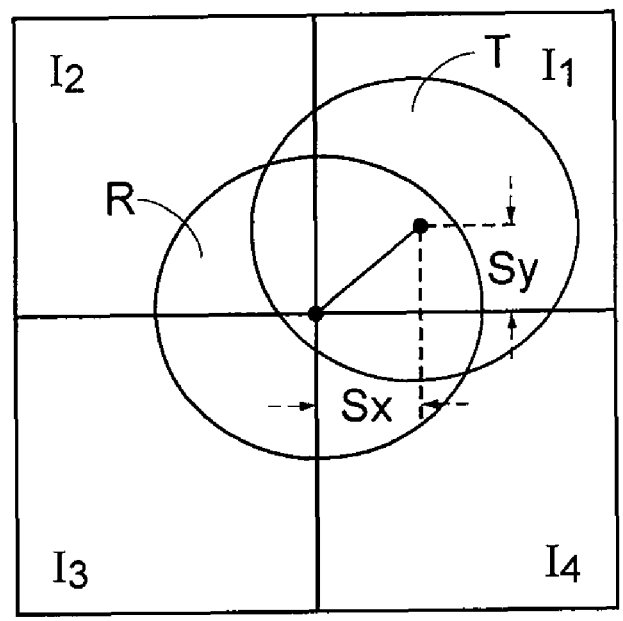
FIG. 6 is a schematic view illustrating reference and test beams on the photoelectric converting units of the quadrant optical detector.

Please refer to FIGS. 3, 4 and 5 again. Assuming that a collimated Gaussian beam is used, the intensity is not uniform over the detector integration surface if the waist of the Gaussian beam upon the detector surface is not much larger than the detector surface size. FIG. 6 is a schematic view illustrating the reference beam R and the test beam T on the surface of the quadrant detector 352, in which the circle indicates the Rayleigh waist of the Gaussian beam. As shown in FIG. 6, the reference beam R and the test beam T are laterally displaced and overlapped on the surface of the quadrant detector 352. Since the reference beam R is well aligned with the center of the quadrant detector 352, the integral intensities of the reference beam R detected by the four photoelectric converting units 3521, 3522, 3523 and 3524 are substantially equal. Since the test beam T is deviated, the integral intensities of the test beam T detected by the four photoelectric converting units 3521, 3522, 3523 and 3524 are denoted as $I_1$, $I_2$, $I_3$ and $I_4$, respectively.

Please refer to FIG. 3 again, a computing unit 36 is electrically connected to the quadrant detector 352 for acquiring measured physical signals from the quadrant detector 352, converting the measured physical signals into electronic signals, and computing the tilting angle and the displacement of the object 33 according to mathematical algorithm that will be described later.

Since the object 33 is deviated from a predetermined surface 36 by a tilting angle $(\alpha,\beta)$, a beam spot displacement vector (Sx,Sy) over the detector plane as a function of the tilting angle $(\alpha,\beta)$ is computed by the following equation:

$$Sx = L\cos(\alpha)$$

$$Sy = L\cos(\beta) \quad (1)$$

where L is the distance measured from the detector plane to the tilting object surface.

Since the reference beam R is well aligned with the center of the quadrant detector 352, a complex amplitude U(x,y) of both Gaussian beams R and T on the quadrant detector 352 is computed by the following equation:

$$U_R(x, y, t) = \frac{A_R(t)W_0}{W(z_R)} \exp\left[-\frac{x^2+y^2}{W^2(z_R)}\right] \exp\left[\begin{array}{c} -ikz_R - ik\frac{x^2+y^2}{2R(z_R)} + \\ i\zeta(z_R) - i\frac{\pi}{4}(n-1) \end{array}\right] \quad (2)$$

$$U_T(x, y, t) = \frac{A_T(t)W_0}{W(z_T)} \exp\left[-\frac{(x-s_x)^2+(y-s_y)^2}{W^2(z_T)}\right] \exp\left[\begin{array}{c} -ikz_T - ik\frac{x^2+y^2}{2R(z_T)} + \\ i\zeta(z_T) + i\frac{\pi}{4}(n-1) \end{array}\right]$$

The subscripts R and T of each term represent the reference beam and test beam, respectively. In the amplitude term, A(t) is the time varying amplitude related to the laser beam intensity fluctuation over time, where $W_0$ is the minimum Gaussian beam waist at Z=0, and Z is the distance light traveled from the minimum waist of the beam. In the phase term, $i\zeta(z)$ is the Guoy phase shift term. R(z) is the radius of curvature of the wavefront in a Gaussian beam. It is to be noted that the last term is the phase shifting term intently induced from the quadrant phase array 351. The quadrant phase array 351 makes a positive and negative phase shifting term to the reference beam R and the test beam T, respectively. In addition, k is the wave number defined as:

$$k = \frac{2\pi}{\lambda} \quad (3)$$

The three major variables to be solved are Sx, Sy, ΔZ, which represent tilt amount in the x direction, tilt amount in the y direction and tilt amount in the z direction, respectively.

The Guoy phase shift term $i\zeta(z)$ can be ignored and compensated later in a displacement type measurement. In a real test, a beam with a large waist could be chosen so that both reference and test beams are well within the Rayleigh's length. Therefore, the following approximation may be made:

$$W(z_R) \approx W(z_T) \approx W_0 \quad (4)$$

Consequently, $$R(z_R) \approx R(z_T) \approx \infty \quad (5)$$

Thus, the second term in the phase expression could be approximated as a constant independent of x and y position. After these approximations are made, the complex amplitude of both beams can be rewritten as $$U_R(x, y, t) = A_R(t)\exp\left[-\frac{x^2+y^2}{W_0}\right]\exp\left[-ikz_R - i\frac{\pi}{4}(n-1)\right] \quad (6)$$

$$U_T(x, y, t) = A_T(t)\exp\left[-\frac{(x-s_x)^2+(y-s_y)^2}{W_0}\right]\exp\left[-ikz_T - i\frac{\pi}{4}(n-1)\right]$$

The interference signal on the detector plane is $$I(x, y) = (U_R(x,y)+U_T(x,y)) \times (U_R(x,y)+U_T(x,y))^* = |U_R(x,y)+U_T(x,y)|^2 \quad (7)$$

Therefore, the total intensity integral in the four quadrants of the quadrant detector 352 can be written as $$\begin{aligned} I_n &= \int_x \int_y |U_R + U_T|^2 \, dx\,dy \\ &= A_R^2 \int_x \int_y \exp\left[\frac{2(x^2+y^2)}{W_0}\right] dx\,dy + B \times \\ &\quad A_R^2 \int_x \int_y \exp\left[\frac{2(x-s_x)^2+(y-s_y)^2}{W_0}\right] dx\,dy + \\ &\quad A_R^2 \sqrt{B} \cos\left(k\Delta z + (n-1)\frac{\pi}{2}\right) \\ &\quad \int_x \int_y \exp\left[-\left(\frac{x^2+y^2+(x-s_x)^2+(y-s_y)^2}{W_0^2}\right)\right] dx\,dy \end{aligned} \quad (8)$$

where B is the intensity ratio between two beams and its value is mostly determined by the transmittance-reflection ratio of the polarization beam splitter 31, $$B = \frac{A_T^2}{A_R^2} \quad (9)$$

Also, the total intensity $I_R$ of the reference beam R can be written as the integration from minus infinity to positive infinity in both x and y directions.

$$I_R = A_R^2 \int_{-\infty}^{\infty} \int_{-\infty}^{\infty} \exp\left[\frac{2(x^2+y^2)}{W_0}\right] dx\,dy \quad (10)$$

In a measurement setup, $I_R$ can be measured easily by simply blocking the test beam and the summation of the four quadrant detector readouts is simply $I_R$. In addition, since the reference beam R is well aligned with the quadrant detector and centered, the intensity contribution to each quadrant is the same $I_R/4$. By adding a photodiode into the optical path to monitor the laser output intensity level fluctuation, the intensity dependence over time could be simplified as a constant in the equation.

In counterclockwise direction as shown in FIG. 6, the integral intensities in each quadrant detector are computed as:

$$\begin{aligned} I_2 &= \frac{I_R}{4} + \\ &\quad BA_R^2 \int_{x=0}^{-h} \int_{y=0}^{h} \exp\left[-\frac{2((x-s_x)^2+(y-s_y)^2)}{W_0^2}\right] dx\,dy - \sin(k\Delta z) \times \\ &\quad A_R^2 \sqrt{B} \int_{x=0}^{-h} \int_{y=0}^{h} \exp\left[-\left(\frac{x^2+y^2+(x-s_x)^2+(y-s_y)^2}{W_0^2}\right)\right] dx\,dy \end{aligned} \quad (11)$$

$$\begin{aligned} I_3 &= \frac{I_R}{4} + BA_R^2 \int_{x=0}^{-h} \int_{y=0}^{-h} \exp\left[-\frac{2((x-s_x)^2+(y-s_y)^2)}{W_0^2}\right] dx\,dy - \\ &\quad \cos(k\Delta z) \times A_R^2 \sqrt{B} \\ &\quad \int_{x=0}^{-h} \int_{y=0}^{-h} \exp\left[-\left(\frac{x^2+y^2+(x-s_x)^2+(y-s_y)^2}{W_0^2}\right)\right] dx\,dy \end{aligned}$$

$$\begin{aligned} I_4 &= \frac{I_R}{4} + BA_R^2 \int_{x=0}^{h} \int_{y=0}^{-h} \exp\left[-\frac{2((x-s_x)^2+(y-s_y)^2)}{W_0^2}\right] dx\,dy + \\ &\quad \sin(k\Delta z) \times A_R^2 \sqrt{B} \end{aligned}$$

-continued $$I_1 = \frac{I_R}{4} + BA_R^2 \int_{x=0}^{h}\int_{y=0}^{h} \exp\left[-\left(\frac{x^2+y^2+(x-s_x)^2+(y-s_y)^2}{W_0^2}\right)\right]dx\,dy$$

$$I_1 = \frac{I_R}{4} + BA_R^2 \int_{x=0}^{h}\int_{y=0}^{h} \exp\left[-\frac{2((x-s_x)^2+(y-s_y)^2)}{W_0^2}\right]dx\,dy +$$

$$\cos(k\Delta z) \times A_R^2 \sqrt{B}$$

$$\int_{x=0}^{h}\int_{y=0}^{h}\exp\left[-\left(\frac{x^2+y^2+(x-s_x)^2+(y-s_y)^2}{W_0^2}\right)\right]dx\,dy \quad (10)$$

After all the above approximations are combined together, we can rewrite the equation as a set of 4 equations with four variables: Sx, Sy, ΔZ, B as shown above. Direct solving the four variables involves a series of error function calculation, which is rather time consuming. Therefore, a four dimensional look-up table with finite elements can be generated before measurement starts and the table look up process is used in combination with numerical interpolation to increase measurement precision. Alternatively, the Levenberg-Marquardt optimization procedure can be used to solve the set of equations to get a least square fitted result.

A thoughtful person may come up with various ways to reduce the number of variables in the equations. For example, the beam intensity ratio B is mostly determined by the transmittion-reflection ratio of the beam splitter. And this transmittion-reflection ratio is a quasi-constant independent of the incident beam intensity. As a result, with a good knowledge of the beam splitter, it's reasonable to approximate the reflection ratio as a constant independent of incident beam intensity. Thus, only three variables are left to be solved and this will significantly speed up the table lookup process. We can also use the Levenberg-Marquardt optimization procedure to solve the set of equations to get a least square fitted result, minimize the noise errors induced in measurement. Consequently, the beam intensity detector that was mentioned before to monitor the laser intensity fluctuation could be dropped and treated as the fourth variable in the set of equations.

Figure 7:
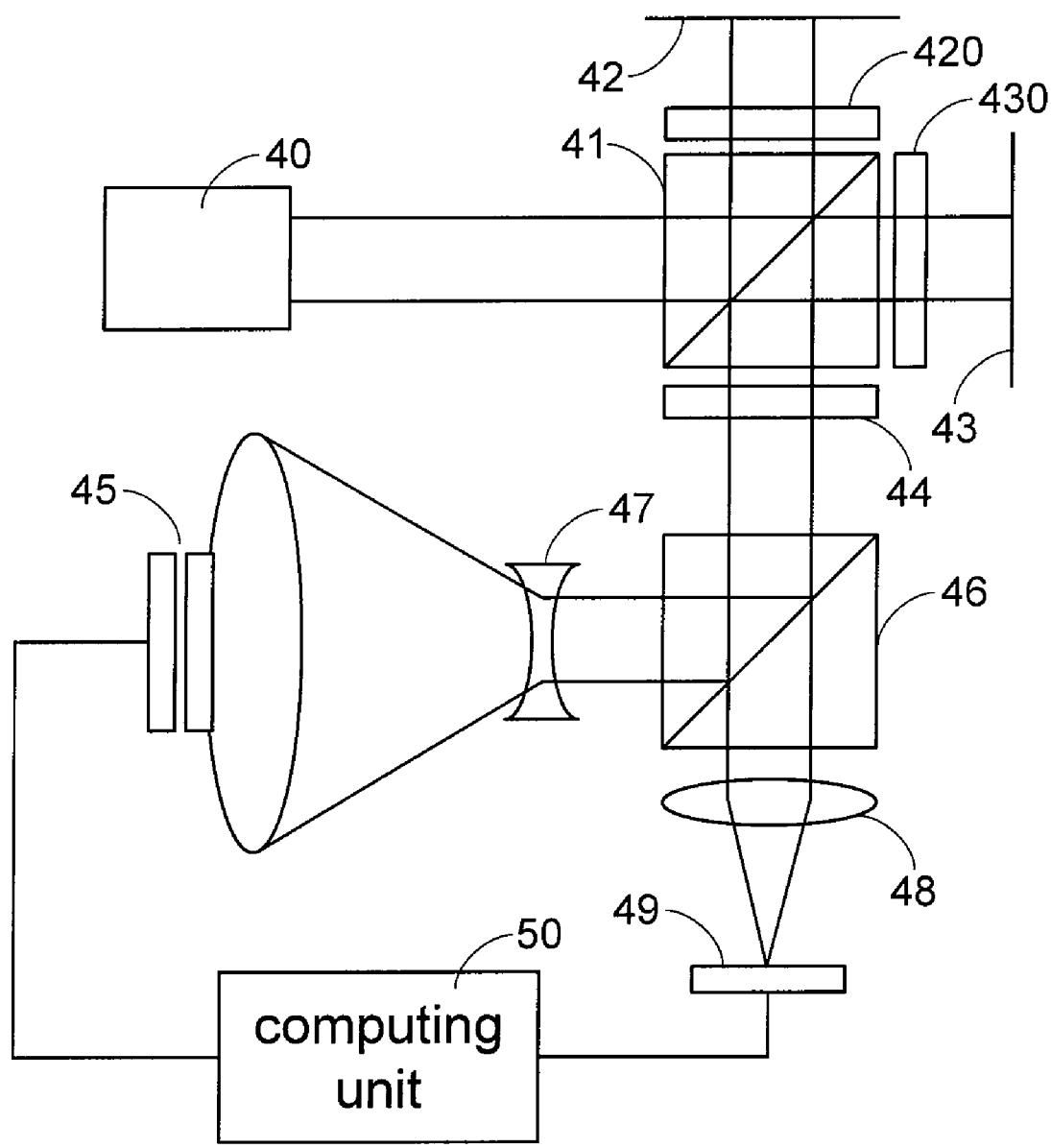
FIG. 7 is a schematic view illustrating a linear displacement and tilting angle measuring device according to a second preferred embodiment of the present invention.

FIG. 7 is a schematic view illustrating an interferometer according to a second preferred embodiment of the present invention. Likewise, the interferometer of the present invention can be used for measuring the linear displacement and tilting angle of an object. As shown in FIG. 7, the interferometer principally comprises a laser source 40, a polarization beam splitter 41, a reference surface 42, a first quarter wave plate 420, an object 43, a second quarter wave plate 430, an analyzer 44, a four-quadrant optical detector 45, an additional beam splitter 46, a diverging lens 47, a convergent lens 48 and an additional quadrant detector 49. The interferometer of this embodiment can be used to measure the linear displacement and the lateral tilt motion of the object 43. The laser source 40, the polarization beam splitter 41, the reference surface 42, the first quarter wave plate 420, the object 43, the second quarter wave plate 430 and the analyzer 44 included in FIG. 7 are similar to those shown in FIG. 3, and are not redundantly described herein. The reference beam R and the test beam T left from the analyzer 44 are split by the beam splitter 46 and thus directed to the four-quadrant optical detector 45 and the quadrant detector 49.

The diverging lens 47 is arranged between the beam splitter 46 and the four-quadrant optical detector 45. Since both beams R and T are diverged by the diverging lens 47 such that the detector surface area is much smaller compared with the beam footprint on the detector. The larger beam footprint on the detector surface means a much more uniform intensity distribution over the detector surface. Thus, the simple and well known phase shifting equation can be used to solve the displacement variable ΔZ as shown in the following equation.

$$I_1 = I_R(1 + B + \sqrt{B}\cos(k \times \Delta z + 0))$$

$$I_2 = I_R(1 + B + \sqrt{B}\cos(k \times \Delta z + \pi/2))$$

$$I_3 = I_R(1 + B + \sqrt{B}\cos(k \times \Delta z + \pi))$$

$$I_4 = I_R(1 + B + \sqrt{B}\cos(k \times \Delta z + 3\pi/2)) \quad (12)$$

Where, we can easily derive that the axial displacement $$\Delta z = \arctan\left(\frac{I_3 - I_1}{I_4 - I_2}\right)/k \quad (13)$$

The quadrant detector 49 is added to independently sense the tilting angle. The quadrant detector 49 has configurations similar to the quadrant detector 352 shown in FIG. 4. The convergent lens 48 is arranged between the beam splitter 46 and the quadrant detector 49 for converging the reference beam R and the test beam T toward the quadrant detector 49. It is assumed that the intensities of the test beam T detected by the four photoelectric converting units of the quadrant detector 49 are denoted as $I_1$, $I_2$, $I_3$ and $I_4$, respectively. In accordance with a feature of the present invention, a deviation amount of the test beam T from the center of the reference beam R can be computed by the computing unit 50 according the intensity difference $(I_1+I_4)-(I_2+I_3)$ and $(I_1+I_2)-(I_3+I_4)$, thereby estimating the tilting angle of the object 43.

From the above embodiment, the interferometer of the present invention is capable of simultaneously measuring the linear displacement and the tilting angle of an object. In addition, since the linear displacement and the tilting angle are separately and independently measured, the accuracy of the measured displacement is increased.

While the invention has been described in terms of what is presently considered to be the most practical and preferred embodiments, it is to be understood that the invention needs not to be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A tilting angle measuring device for use between a reference surface, an object and a coherent light source, the tilting angle measuring device comprising:

an optical device for receiving a light beam emitted by the coherent light source, and splitting the light beam into a first sub-beam and a second sub-beam, directing the first sub-beam to the reference surface such that a third sub-beam is reflected by the reference surface, directing the second sub-beam to the object such that a fourth sub-beam is reflected by the object, and processing the third and fourth sub-beams into a fifth sub-beam and a sixth sub-beam, respectively;

a four-quadrant optical detector having four photoelectric converting units arranged in an array for respectively receiving the fifth and sixth sub-beams outputted by the optical device; and a computing unit electrically connected to the four-quadrant optical detector for computing a tilting angle of the object with respect to a predetermined position according to four intensity values of the sixth sub-beam.

2. The tilting angle measuring device according to claim 1 wherein the light beam emitted by the coherent light source is a laser beam of a single wavelength.

3. The tilting angle measuring device according to claim 1 wherein the light beam emitted by the coherent light source is a laser beam that is a combination of a first wavelength light and a second wavelength light, which have orthogonal polarization directions.

4. The tilting angle measuring device according to claim 3 wherein the optical device comprises:

a polarization beam splitter for splitting the light beam into the first sub-beam and the second sub-beam;

a first quarter wave plate arranged between the polarization beam splitter and the reference surface for changing phases of the first sub-beam and the third sub-beam; and a second quarter wave plate arranged between the polarization beam splitter and the object for changing phases of the second sub-beam and the fourth sub-beam.

5. The tilting angle measuring device according to claim 1 further comprising a convergent lens, which is arranged between the optical device and the four-quadrant optical detector, for converging the fifth and sixth sub-beams outputted by the optical device to the four-quadrant optical detector.

6. The tilting angle measuring device according to claim 1 wherein the four photoelectric converting unit of the four-quadrant optical detector have the same dimensions and are arranged in a 2×2 array, and the fifth sub-beam is aligned with the center of the four-quadrant optical detector.

7. The tilting angle measuring device according to claim 1 wherein the intensity values of the fifth sub-beam received by the four photoelectric converting units are substantially equal.

8. The tilting angle measuring device according to claim 1 wherein the four intensity values of the sixth sub-beam are respectively $I_1$, $I_2$, $I_3$ and $I_4$, and a deviation amount of the sixth sub-beam from the center of the fifth sub-beam is computed by the computing unit according the intensity difference $(I_1+I_4)-(I_2+I_3)$ and $(I_1+I_2)-(I_3+I_4)$, thereby estimating the tilting angle of the object with respect to the predetermined position.

9. A linear displacement and tilting angle measuring device for use between a reference surface, an object surface and a coherent light source, the linear displacement and tilting angle measuring device comprising:

an optical device for receiving a light beam emitted by the coherent light source, and splitting the light beam into a first sub-beam and a second sub-beam, directing the first sub-beam to the reference surface such that a third sub-beam is reflected by the reference surface, directing the second sub-beam to the object surface such that a fourth sub-beam is reflected by the object surface, and processing the third and fourth sub-beams into a fifth sub-beam and a sixth sub-beam, respectively;

a four-quadrant optical detector having four linear polarizers oriented in four polarization directions and arranged in an array and four photoelectric converting units arranged in an array for respectively receiving the fifth and sixth sub-beams outputted by the optical device; and a computing unit electrically connected to the four-quadrant optical detector for computing a linear displacement and a tilting angle of the object with respect to a predetermined position according to four intensity values of the sixth sub-beam.

10. The linear displacement and tilting angle measuring device according to claim 9 wherein the light beam emitted by the coherent light source is a laser beam of a single wavelength.

11. The linear displacement and tilting angle measuring device according to claim 9 wherein the light beam emitted by the coherent light source is a laser beam that is a combination of a first wavelength light and a second wavelength light, which have orthogonal polarization directions.

12. The linear displacement and tilting angle measuring device according to claim 9 wherein the four photoelectric converting unit of the four-quadrant optical detector have the same dimensions and are arranged in a 2×2 array, and the fifth sub-beam is aligned with the center of the four-quadrant optical detector.

13. The linear displacement and tilting angle measuring device according to claim 12 wherein the four linear polarizers of the four-quadrant optical detector are oriented in four uniformly distributed polarization directions so as to produce an array of four phase shifted interference intensities.

14. The linear displacement and tilting angle measuring device according to claim 12 wherein the polarization directions of the four linear polarizers are oriented such that the polarization angle of each quadrant polarizer has 45 degrees difference to their neighboring polarizers.

15. The linear displacement and tilting angle measuring device according to claim 9 wherein the intensity values of the fifth sub-beam received by the four photoelectric converting units are substantially equal.

16. The tilting angle measuring device according to claim 9 wherein the linear displacement of the object with respect to the predetermined position and a deviation amount of the sixth sub-beam from the center of the fifth sub-beam are computed by the computing unit according a numerical analysis associated with the four intensity values of the sixth sub-beam, and the tilting angle of the object with respect to the predetermined position is calculated according to the deviation amount.

* * * * *